United States Patent
Kunze et al.

(10) Patent No.: US 7,819,941 B2
(45) Date of Patent: Oct. 26, 2010

(54) METHOD FOR REDUCING AND/OR REFINING A METAL-CONTAINING SLAG

(75) Inventors: Jürgen Kunze, Xanten (DE); Rolf Degel, Ratingen (DE); Dieter Borgwardt, Ratingen (DE); Andrzej Warczok, Toronto (CA); Gabriel Angel Riveros Urzua, Santiago (CL); Marco Antonio Caceres Rivera, Santiago (CL); Roberto Marcelo Parada Araya, San Felipe (CL)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 167 days.

(21) Appl. No.: 11/921,583

(22) PCT Filed: Jun. 8, 2006

(86) PCT No.: PCT/EP2006/005496

§ 371 (c)(1),
(2), (4) Date: Jul. 29, 2008

(87) PCT Pub. No.: WO2006/131371

PCT Pub. Date: Dec. 14, 2006

(65) Prior Publication Data

US 2009/0114063 A1     May 7, 2009

(30) Foreign Application Priority Data

Jun. 8, 2005 (DE) .................... 10 2005 026 590
May 16, 2006 (DE) .................... 10 2006 022 780

(51) Int. Cl.
*C22B 7/04* (2006.01)
*C22B 15/14* (2006.01)

(52) U.S. Cl. ............... 75/585; 75/633; 75/629; 75/640; 75/643; 75/655; 75/695

(58) Field of Classification Search .......... 75/585, 75/640, 629, 655, 633, 695
See application file for complete search history.

(56) References Cited

U.S. PATENT DOCUMENTS

| | | | |
|---|---|---|---|
| 3,126,274 A * | 3/1964 | Aamot ............... | 75/10.35 |
| 4,036,636 A | 7/1977 | Amman et al. | |
| 4,543,122 A | 9/1985 | Bodenstein et al. | |
| 5,626,646 A | 5/1997 | Krofchak | |
| 5,865,872 A | 2/1999 | Krofchak et al. | |

FOREIGN PATENT DOCUMENTS

| | | |
|---|---|---|
| EP | 1 354 969 | 10/2003 |
| GB | 1 168 364 | 10/1969 |
| KZ | 7174 | 3/1850 |
| RU | 2219247 | 1/2003 |
| SU | 1809838 | 4/1993 |

OTHER PUBLICATIONS

Riveros Gabriel et al: "Kinetics of Copper Slag Reduction With . . . ", Nov. 2004, BD. 56, No. 11, p. 178, XP002392212.

* cited by examiner

*Primary Examiner*—George Wyszomierski
*Assistant Examiner*—Tima M McGuthry-Banks
(74) *Attorney, Agent, or Firm*—Lucas & Mercanti, LLP; Klaus P. Stoffel

(57) ABSTRACT

The invention relates to a method for reducing and/or refining a metal-containing slag. The aim of the invention is to improve reduction of the slag. For this purpose, calcium carbide ($CaC_2$) is added to the slag as the reducing agent.

8 Claims, No Drawings

METHOD FOR REDUCING AND/OR REFINING A METAL-CONTAINING SLAG

The invention concerns a method for reducing and/or cleaning a metal-bearing slag.

The present invention pertains especially to a method for intensive reduction of a melt, conversion above all of copper slags, and recovery of copper from these slags. However, the method can also be used in exactly the same way for slags that contain other metals.

The melting of copper concentrates produces matte and slag. Copper matte is converted to blister copper, and the matte is fed to a slag cleaning process. Copper slag is cleaned by a variety of technologies, such as reduction and sedimentation, hydrometallurgical slag leaching, or slag flotation after slow cooling, crushing, and grinding. Pyrometallurgical methods are based on slag treatment in an electric furnace, an El Teniente slag cleaning furnace, or an Ausmelt converter.

Copper is present in the slag in the form of inclusions of copper matte in the size range of 5 to 1,000 μm and in the form of dissolved copper(I) oxide. The recovery of copper matte inclusions requires the reduction of magnetite in order to reduce the apparent viscosity of the slag and to release enclosed inclusions by magnetite crystals. The reduction of magnetite with carbon is carried out first by direct reduction, followed by the Boudouard reaction and indirect magnetite reduction:

$$(Fe_3O_4)_{slag} + [C]_{solid} \Rightarrow 3(FeO)_{slag} + \{CO_2\}_{gas}$$

$$[C]_{solid} + \{CO_2\}_{gas} \Rightarrow 2\{CO\}_{gas}$$

$$Fe_3O_4)_{slag} + \{CO\}_{gas} \Rightarrow 3(FeO)_{slag} + \{CO_2\}_{gas}$$

The recovery of dissolved copper from the slag requires the reduction of copper(I) oxide:

$$(Cu_2O)_{slag} + \{CO\}_{gas} \Rightarrow 2(Cu)_{metal} + \{CO_2\}_{gas}$$

The reduction of copper(I) oxide is limited to the co-reduction of magnetite. The conditions of the co-reduction are determined by the equilibrium of the reaction:

$$(Cu_2O)_{slag} + 3(FeO)_{slag} \Leftrightarrow 2(Cu)_{metal} + (Fe_3O_4)_{slag}$$

The reaction of the magnetite reduction with carbon is strongly endothermic. Assuming that the waste gas ratio of $CO/CO_2 = 1$, then $$3(Fe_3O_4)_{slag} + 2[C]_{solid} \Rightarrow 9(FeO)_{slag} + \{CO\}_{gas} + \{CO_2\}_{gas}$$

where the heat of reaction is given by:

$$\Delta H^{1250°\,C.} = 128 \text{ kJ/mole Fe}_3O_4$$

This means that to reduce the magnetite content from 20% to 5%, energy in the amount of 89 MJ per 1 t of slag must be supplied by electric current or the combustion of fuel. Due to the Boudouard reaction in the coke bed floating on the surface of the slag, the $CO/CO_2$ ratio is very high, which leads to a higher energy requirement of about 138 MJ/t, which in turn corresponds to 38 kWh/t of slag. Due to the necessary elevation of the slag temperature to about 1,300° C. and heat losses in the furnace, the total unit energy consumption is on the order of 100 kWh/t.

U.S. Pat. No. 5,865,872 describes a method for recovering metal and producing a secondary slag from the base metal, in which at least one reducing agent is added to the slag, with various agents being considered. Especially carbon is considered suitable for this purpose, and the use of carbon in amounts up to 40% is proposed. U.S. Pat. No. 5,626,646 provides for the use of iron silicate for the recovery of metals from slags. The method proposed in U.S. Pat. No. 4,036,636 also provides for the addition of a solid reducing agent in the recovery of nickel from a molten slag.

Other solutions that provide for the addition of calcium carbide to the molten slag are described in GB 1 168 364 and EP 1 354 969.

The objective of the invention is to develop an improved method for reducing a metal-bearing melt.

The solution to this problem by the invention, which comprises a method for reducing and cleaning a slag in which calcium carbide ($CaC_2$) is added to the slag as a reducing agent, is characterized by the fact that the calcium carbide is charged into a furnace before the molten slag is charged into the furnace.

The calcium carbide ($CaC_2$) is preferably added in an amount of 0.1% to 2.0% of the mass of the slag, and an amount of 0.5% to 1.5% of the mass of the slag is especially preferred. The amount of calcium carbide ($CaC_2$) added is preferably determined as a function of the concentration of magnetite and/or copper(I) oxide in the slag.

Besides the calcium carbide ($CaC_2$), it is also possible to add an additional reducing agent. A solid substance, especially coke, charcoal, and/or pig iron, can be used as the additional reducing agent. It is also possible to use a carbon-bearing substance for this purpose, especially bunker fuel oil, diesel oil, natural gas, and/or coal dust. In this regard, the additional reducing agent can be injected into the molten slag.

The slag preferably contains copper (Cu). However, it is equally possible for the slag to contain lead (Pb), zinc (Zn), platinum (Pt), or nickel (Ni).

The invention is thus aimed at a new method of intensive slag reduction and cleaning. This method is a pyrometallurgical method of slag reduction and cleaning.

In accordance with the invention, the intensive slag reduction can involve:

(a) the optional injection of solid, liquid, or gaseous reducing agents through injection nozzles;

(b) slag sedimentation.

Calcium carbide reacts with magnetite, which is dissolved in fatalist slag:

$$4(Fe_3O_4)_{slag} + [CaC_2]_{solid} + (Fe_2SiO_4)_{slag} \Rightarrow 14(FeO)_{slag} + (CaSiO_3)_{slag} + \{CO\}_{gas} + \{CO_2\}_{gas}$$

The reaction is exothermic at 1,250° C.

$$\Delta H^{1250°\,C.} = -11 \text{ kJ/mole Fe}_3O_4$$

The reduction of copper(I) oxide from a molten fayalite slag is strongly exothermic:

$$4(Cu_2O)_{slag} + [CaC_2]_{solid} + (Fe_2SiO_4)_{slag} \Rightarrow 8(Cu)_{metal} + (CaSiO_3)_{slag} + (FeO)_{slag} + \{CO\}_{gas} + \{CO_2\}_{gas} \quad \Delta H^{1250°\,C.} = -184 \text{ kJ/mole Cu}_2O$$

The liberated heat leads to an increase in the temperature at the transition between molten slag/carbide, which, together with a change in the slag structure at the transition by CaO, leads to a considerable acceleration of the reduction rate.

The present invention has the following advantages over traditional methods of slag reduction and cleaning:

(a) A very high rate of slag reduction leads to intensification of the process, the time required for slag reduction is shortened, and energy consumption due to unit energy losses is reduced.

(b) The consumption of electric energy or fuel is reduced due to the exothermic effect of the magnetite reduction and the strong exothermic effect of the reduction of copper(I) oxide.

EXAMPLE 1

Slag Cleaning in the El Teniente Slag Cleaning Furnace

Before a molten slag from the melting furnace is charged, calcium carbide is fed into the furnace through the opening. The amount of calcium carbide is determined by the composition of the slag, especially by the magnetite concentration, and varies from 0.5% to 1.5% of the slag mass. The slag is then slowly poured into the furnace through the furnace mouth or the pouring spout. An intense reduction reaction during the charging, lowers the magnetite concentration to the necessary level of about 5%. Due to the exothermic effect of the reaction, the slag temperature rises from 1,250 to 1,263° C. during the charging and reduction if the combusted fuel covers the heat losses of the furnace.

After the slag has been charged, the slag reduction is concluded, and the sedimentation process begins, after which the slag is drawn off, and the copper matte is tapped, which is identical with the conventional process. The cycle of slag cleaning in the El Teniente furnace can be shortened by about 50%, which corresponds to a doubling of the furnace slag treatment capacity.

EXAMPLE 2

Slag Cleaning in the Electric Furnace

Molten slag is treated in the electric furnace by reduction with coke and the carbon from electrodes, with the superheating followed by sedimentation. At the beginning of a new cycle, before the liquid slag is charged, the calcium carbide is charged into the furnace. The addition of calcium carbide depends on the composition of the slag and is in the range of 0.5% to 1.5% of the mass of the slag. Molten slag is then poured into the furnace. During charging with the molten slag, contact between the carbide particles and the flowing slag results in intense, rapid reduction of the slag. Calcium carbide begins to float on the surface of the slag, and the reduction proceeds with the electrodes immersed and supplying electric energy. Due to the exothermic effect of the reduction reactions, the slag temperature does not decline. The electric power input is controlled in such a way that it covers the heat losses and effects a slight rise in slag temperature. The degree of magnetite reduction and the co-reduction of the copper(I) oxide are higher and thus ensure increased recovery of copper. Very intense slag reduction makes it possible to shorten the reduction time while maintaining a similar sedimentation time. This leads to a shorter cycle due to the intense reduction, and the shorter cycle in turn ultimately leads to an increase in the productivity of the furnace.

The replacement of coke as the reducing agent by calcium carbide reduces the unit energy consumption and also considerably reduces the unit consumption of reducing agent.

The invention claimed is:

1. A method for reducing and/or cleaning a metal-bearing slag, where calcium carbide ($CaC_2$) is used as a reducing agent and slag is added to the calcium carbide ($CaC_2$), wherein the calcium carbide ($CaC_2$) is charged into a furnace before molten slag is charged into the furnace, wherein the calcium carbide ($CaC_2$) is added in an amount of 0.1% to 2.0% of the mass of the slag.

2. A method in accordance with claim 1, wherein the calcium carbide ($CaC_2$) is added in an amount of 0.5% to 1.5% of the mass of the slag.

3. A method in accordance with claim 1, wherein besides the calcium carbide ($CaC_2$), additional reducing agents are added.

4. A method in accordance with claim 3, wherein a solid substance, especially coke, charcoal and/or pig iron, is used as the additional reducing agent.

5. A method in accordance with claim 3, wherein a carbon-bearing substance, especially bunker fuel oil, diesel oil, natural gas, and/or coal dust is used as the additional reducing agent.

6. A method in accordance with claim 3, wherein the additional reducing agent is injected into the molten slag.

7. A method in accordance with claim 1, wherein the slag contains copper (Cu).

8. A method in accordance with claim 1, wherein the slag contains lead (Pb), zinc (Zn), platinum (Pt), or nickel (Ni).

\* \* \* \* \*